US006633913B1

(12) United States Patent
Chalstrom et al.

(10) Patent No.: US 6,633,913 B1
(45) Date of Patent: Oct. 14, 2003

(54) SCAN SYSTEM AND METHOD FOR SCANNING IMAGES TO AN ONLINE WEB PAGE

(75) Inventors: Robert E. Chalstrom, Fort Collins, CO (US); Robert D. Thompson, Loveland, CO (US); Paul S. Beiser, Fort Collins, CO (US); Douglas Mathre, Loveland, CO (US); Edgar M. Roman, Longmont, CO (US)

(73) Assignee: Hewlett-Packard Development Company, LP., Houston, TX (US)

( * ) Notice: Subject to any disclaimer, the term of this patent is extended or adjusted under 35 U.S.C. 154(b) by 0 days.

(21) Appl. No.: 09/382,168

(22) Filed: Aug. 24, 1999

(51) Int. Cl.[7] ............................................. G06F 15/173
(52) U.S. Cl. ....................... 709/226; 709/225; 709/229; 707/500; 707/501; 707/513
(58) Field of Search ................................ 709/225, 226, 709/229; 707/500, 513, 501

(56) References Cited

U.S. PATENT DOCUMENTS

| 5,659,164 | A | * | 8/1997 | Schmid et al. ............... 235/375 |
| 5,764,866 | A | | 6/1998 | Maniwa |
| 6,026,433 | A | * | 2/2000 | D'Arlach et al. ............ 709/217 |
| 6,115,739 | A | * | 9/2000 | Ogawa et al. ............... 709/215 |
| 6,122,661 | A | * | 9/2000 | Stedman et al. ............. 709/217 |
| 6,263,352 | B1 | * | 7/2001 | Cohen .......................... 707/513 |
| 6,275,829 | B1 | * | 8/2001 | Angiulo et al. .............. 707/104 |
| 6,278,448 | B1 | * | 8/2001 | Brown et al. ................ 345/333 |
| 6,313,835 | B1 | * | 11/2001 | Gever et al. ................. 345/357 |
| 6,425,001 | B2 | * | 7/2002 | Lo et al. ...................... 709/217 |

FOREIGN PATENT DOCUMENTS

| GB | 2324002 A | 10/1998 |
| GB | 2331663 A | 5/1999 |
| WO | WO98/58335 | 12/1998 |
| WO | WO99/48276 | 9/1999 |

* cited by examiner

Primary Examiner—Saleh Najjar

(57) ABSTRACT

A system and method provide users the ability to quickly and efficiently transfer images from a scanner to an online web page. In particular, the system can be implemented as follows. A scanner scans an image in order to generate a scanned image. A transferring mechanism takes the scanned image generated by said scanner, and transfers the scanned image to a web device for storage. The web device is located on and accessed by a network. The web device manages and stores scanned images.

24 Claims, 11 Drawing Sheets

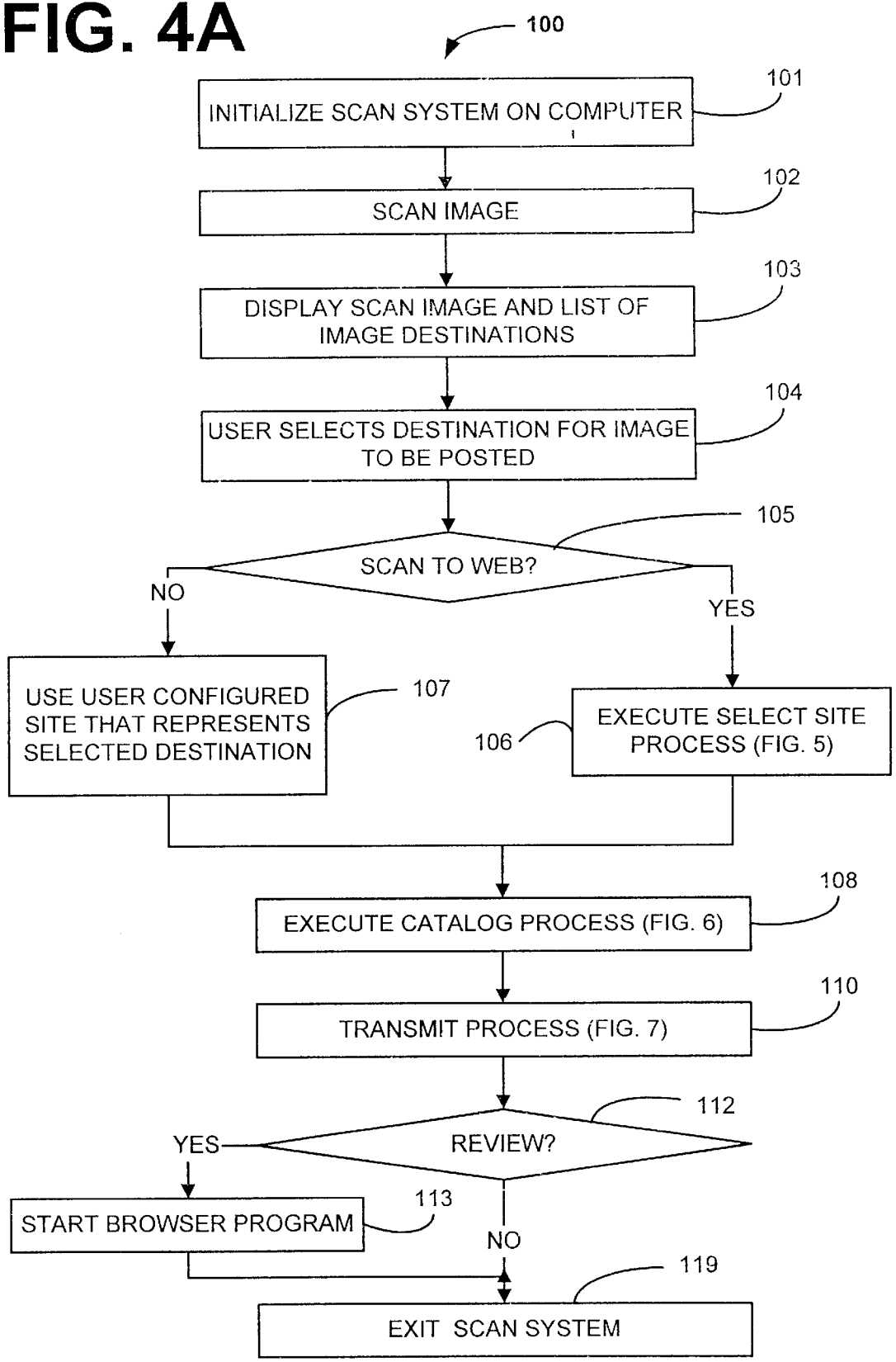

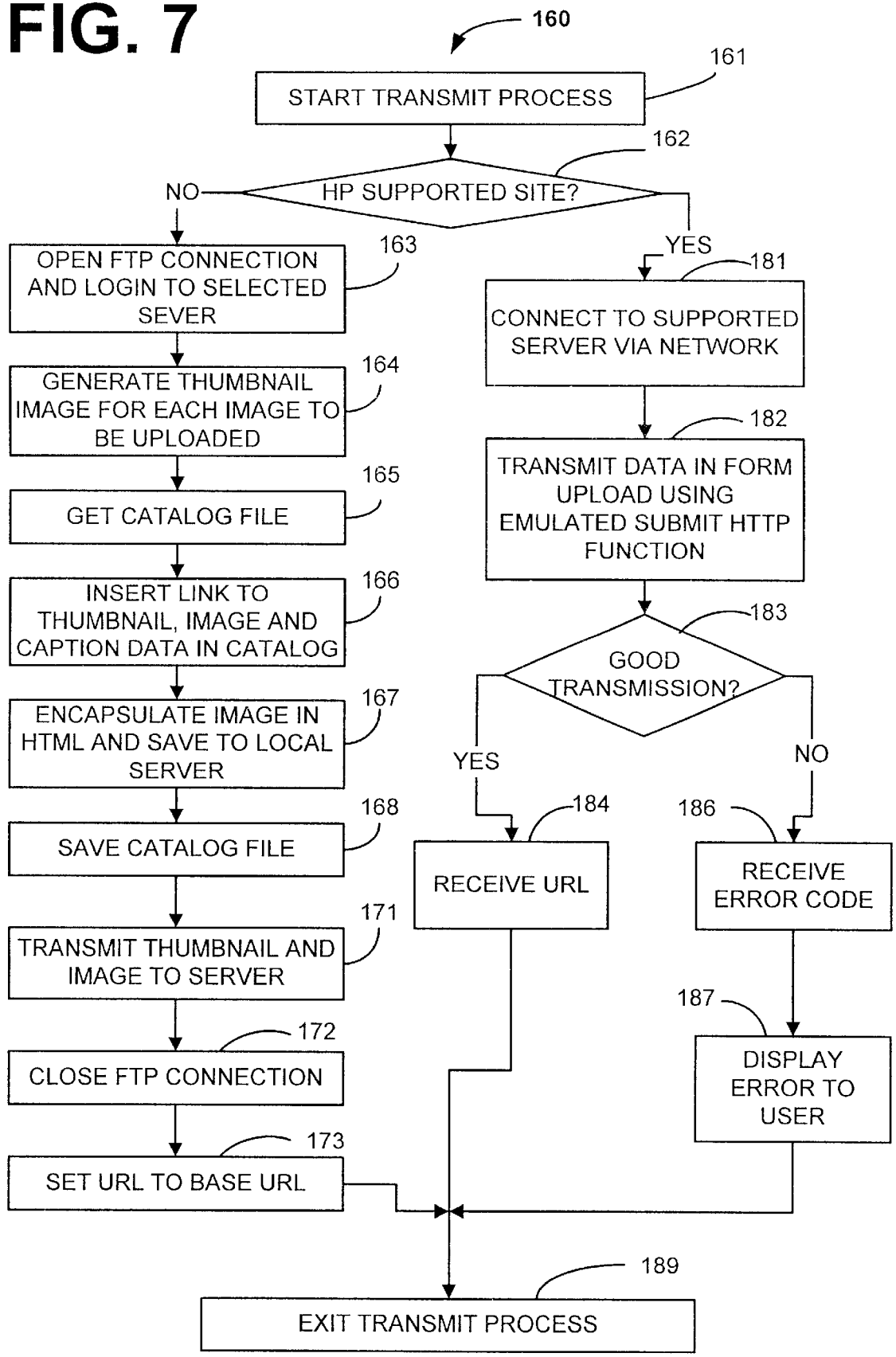

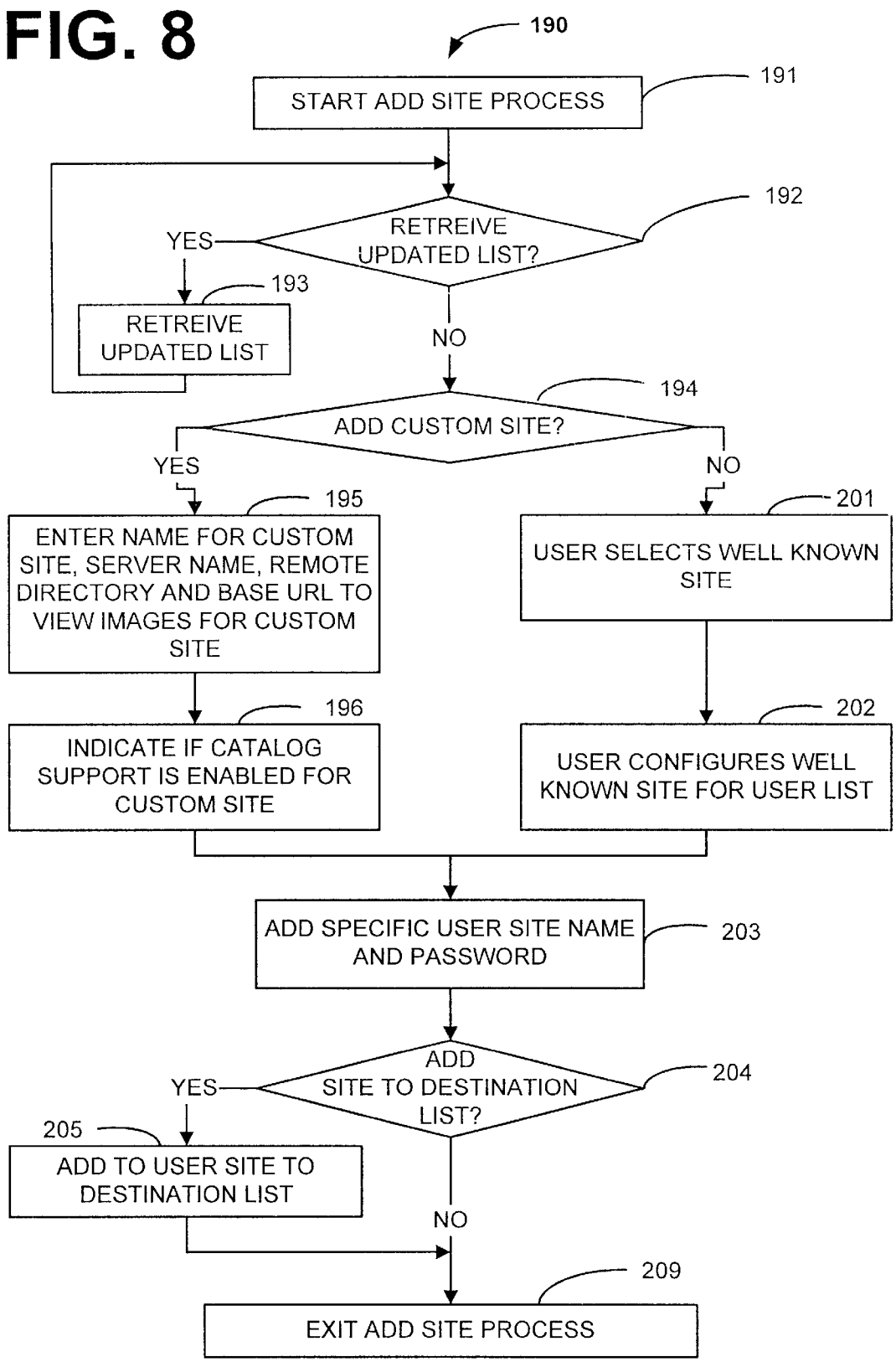

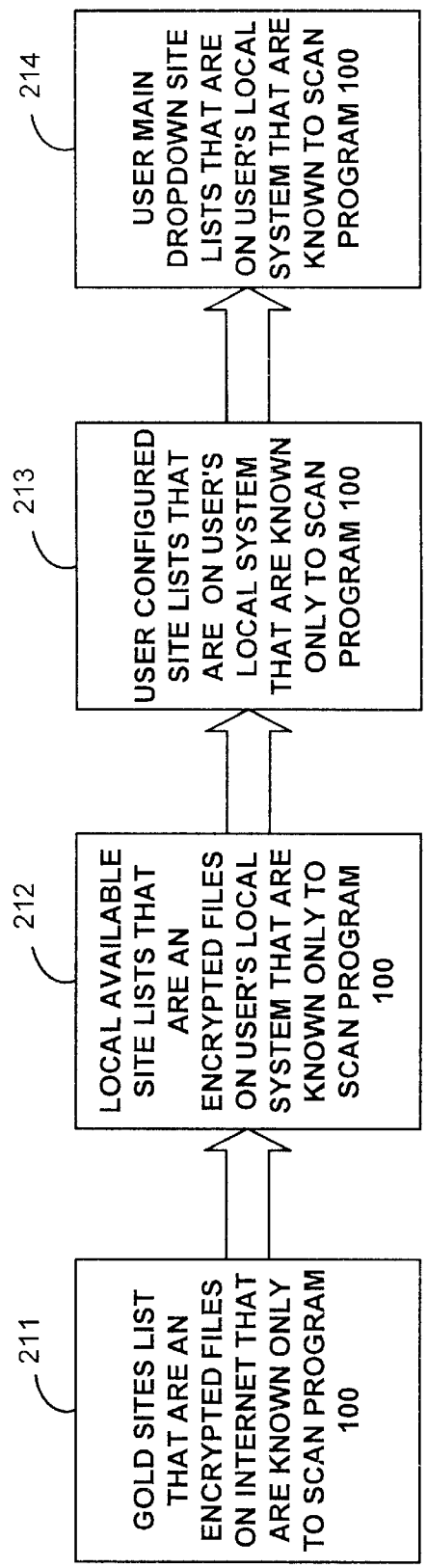

SCAN SYSTEM AND METHOD FOR SCANNING IMAGES TO AN ONLINE WEB PAGE

BACKGROUND OF THE INVENTION

1. Field of the Invention

The present invention generally relates to computers and software, and more particularly, to a scan system and method providing users the ability to quickly and efficiently transfer images from a scanner to an online web page.

2. Description of Related Art

As known in the art, the Internet is a worldwide collection of networks and gateways that use the TCP/IP suite of protocols to communicate with one another. At the heart of the Internet is a backbone of high-speed data communication lines between major nodes or host computers consisting of thousands of commercial, government, educational and other computer systems that route data and messages.

World Wide Web (WWW) refers to the total set of interlinked hypertext documents residing on hypertext transfer protocol (HTTP) servers all around the world. Documents on the WWW, called pages or web pages, are written in hypertext mark-up language (HTML) identified by uniform resource locators (URL) that specify the particular machine and pathname by which a file can be accessed and transmitted from node to node to the end user under HTTP. A web site is a related group of these documents and associated files, scripts, subprocedures, and databases that are provided by an HTTP server on the WWW.

Users need a browser program and an Internet connection to access a web site. Browser programs, also called "web browsers," are client applications that enable a user to navigate the Internet and view HTML documents on the WWW, another network, or the user's computer. Web browsers also allow users to follow codes called "tags" embedded in an HTML document, which associate particular words and images in the document with URLs so that a user can access another file that may be half way around the world, at the press of a key or the click of a mouse.

These files may contain text (in a variety of fonts and styles), graphic images, movie files, and sounds as well as java applets, perl applications, other scripted languages, active X-controls, or other small embedded software programs that execute when the user activates them by clicking on a link.

A key difficulty with posting image documents to a server on the WVWW is that of simplicity for novice user. How does a novice user construct their own web page of images? Typically, the prior solution for providing web page construction of images requires the user to: (1) scan the images to disk; (2) write an HTML page to display each image; (3) write an HTML catalog to link the image files together; (4) generate small thumbnail images from full-size images; (5) insert the thumbnail image into the HTML catalog file; (6) upload the entire collection of images and HTML file to a server associated with an internet service provider (I. S. P.); and (7) start the browser to go to the proper URL for the image web site. Needless to say, each of the previous steps is a complicated and time-consuming task for even the most experienced scanner owner.

Thus, a heretofore unaddressed need exists in the industry to address the aforementioned deficiencies and inadequacies.

SUMMARY OF THE INVENTION

The present invention is generally directed to a system and method for scanning images to a web site.

Briefly described, in architecture, the scan system can be implemented as follows. A scanner is provided for scanning an image in order to generate a scanned image. A transferring mechanism takes the scanned image generated by the scanner, and transfers the scanned image to a web device for storage. The web device is located on and accessed by a network. The web device manages and stores scanned images.

The present invention can also be viewed as providing a method for scanning images directly to a web site. In this regard, the method can be broadly summarized by the following steps: (1) scanning an image using a scanner; (2) determining a location on a network to transfer the image; (3) connecting the scanner to the network; and (4) transmitting the image to the location on the network.

The system and method for scanning images directly to a web site enables a scanner to transfer images directly to a web site without the use of a computer. The system and method for scanning images directly to a web site is also a user friendly and efficient method for quickly and efficiently creating an image web site.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 4A is a flow chart of the computer-controlled scan to web application for the user computer system of the present invention, as shown in FIG. 3A.

FIG. 7 is a flow chart of the transmit process for the scan system of the present invention, on both the computer-controlled and stand-alone scanner, as shown in FIGS. 4A and 4B.

FIG. 8 is a flow chart of the add site process for the scan system of the present invention, on both the computer-controlled and stand-alone scanner, as shown in FIGS. 4A and 4B.

FIG. 9 is a block diagram illustrating the scan system data flow of site lists for image web site destinations.

DETAILED DESCRIPTION OF THE PREFERRED EMBODIMENT

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

Figure 1:
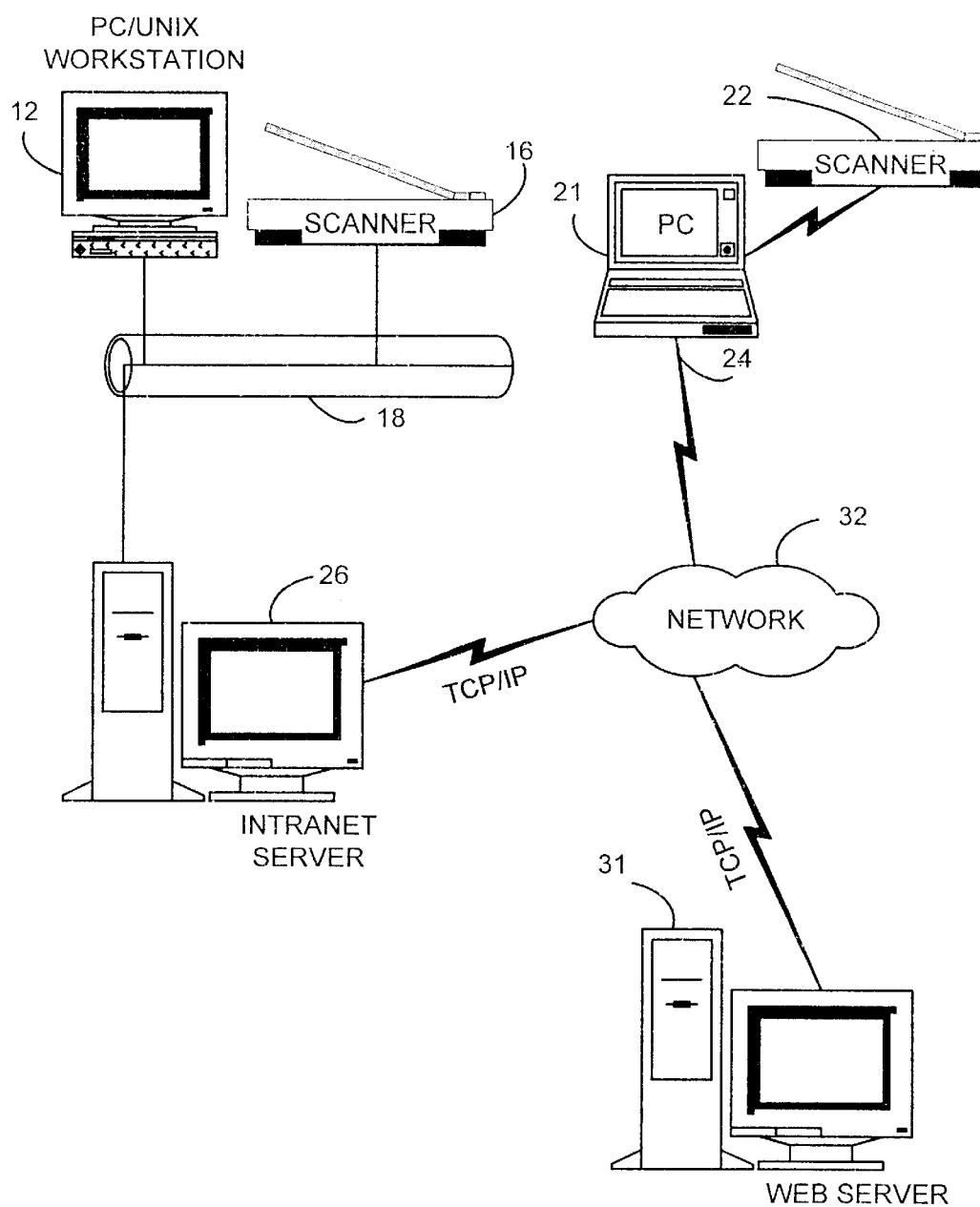
FIG. 1 is a block diagram of various possible scan systems of the present invention.

Turning now to the drawings, FIG. 1 is a block diagram of possible system configurations that illustrate the flexibility and platform independence of the present invention. While the scan system configuration could take many forms, the diagram of FIG. 1 illustrates a plurality of scan devices 16 and 21, that are directly connected to a network 32, for example, but not limited to, a dial-in, LAN, WAN, PSTN, Intranet and Internet communication links (18 and 24). Each of the scan systems in FIG. 1 are uniquely illustrated to emphasize that scan systems may comprise diverse hardware platforms.

As can be seen from FIG. 1, the scan systems may comprise a scanner 22 that is connected to a computer 21. This allows the computer 21 to execute a scan system that interacts with scanner 22.

It is also illustrated in FIG. 1 that a stand-alone scanner 16 may be directly connected to a server 26 via a communication link 18. Network 18 may be, for example, an Ethernet type network (e.g., 10 BASE 2, 10 BASE 5, 10 BSAF, 10 BASE-T), a baseband network, a coaxial cable, a dial-in, LAN, WAN, PSTN, Intranet and the Internet.

Figure 2:
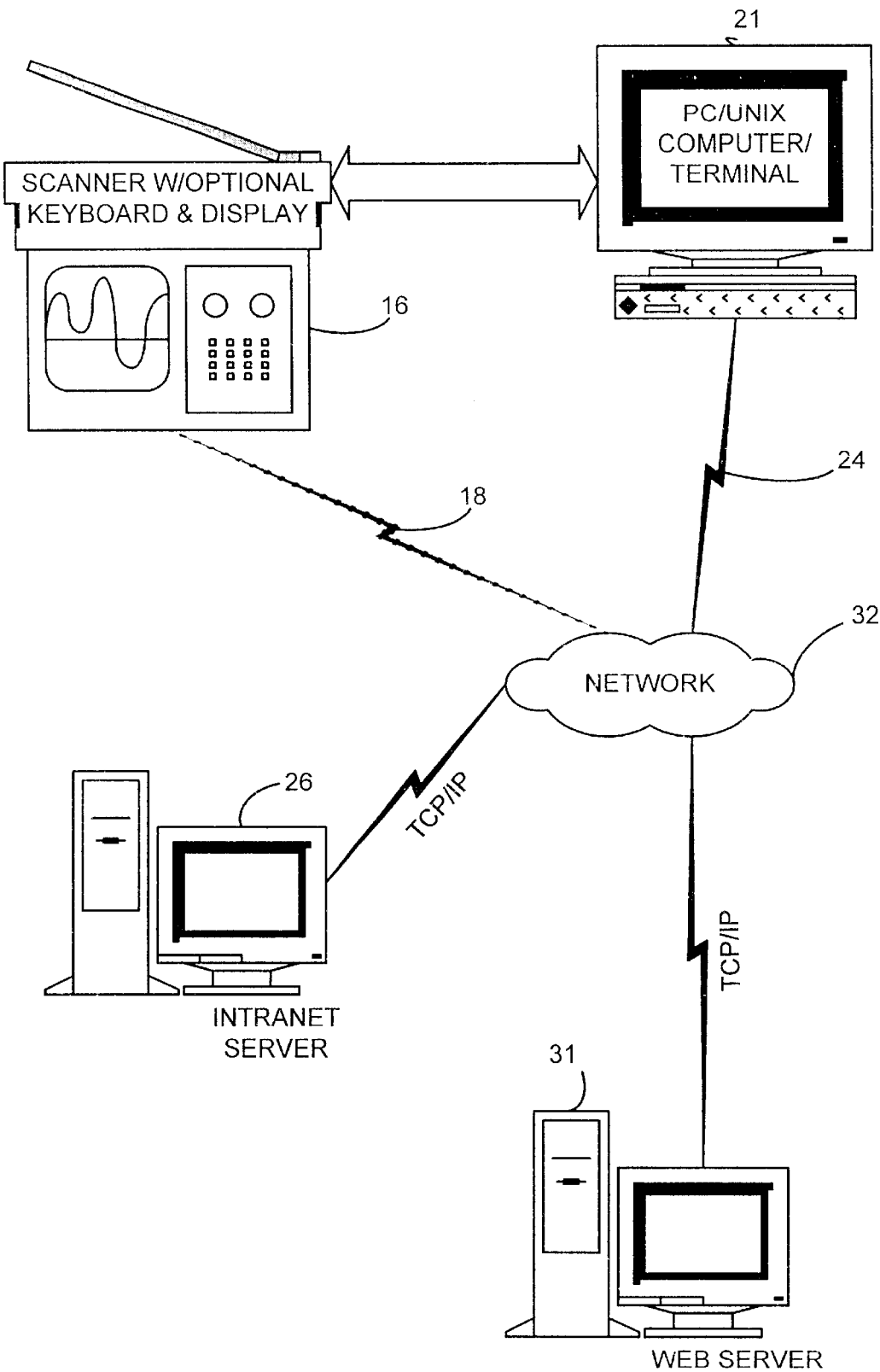
FIG. 2 is a block diagram further illustrating in greater detail the possible scan systems of the present invention.

Illustrated in FIG. 2 is a more detailed figure, showing that a scanner 16 may be connected directly to a user computer 21 or with an optional keyboard and display directly connected to a network 32). The stand-alone scanner 16 includes the scan system 120 (FIG. 4B) that it is specifically designed to operate on stand-alone scanner systems. For some stand-alone scanners 16 to provide for scanning images directly to a LAN, WAN, Intranet or Internet network site, the stand-alone scanners 16 sometimes include a keypad and at least a limited display. In those instances where the stand-alone scanner 16 does not include an optional keypad or display, the user presets the destination network site. The identification of this preset destination network site can be downloaded via the communication link 18 or programmed utilizing standard methods.

Figure 3A:
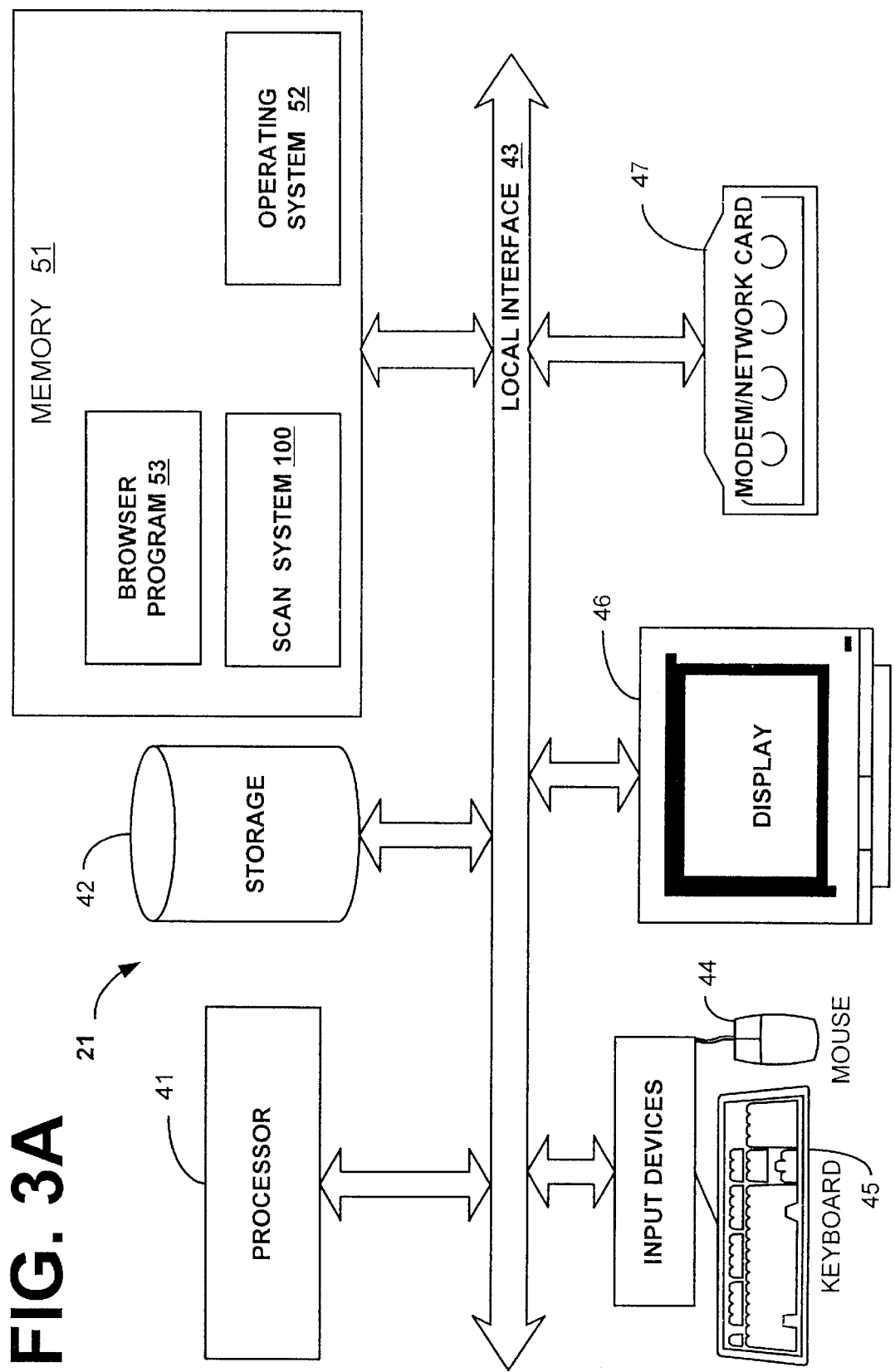
FIG. 3A is a block diagram illustrating the scan system and a browser program situated within a computer readable medium, for example, in a user computer system.

As illustrated in FIG. 3A, a computer system that employs the scan system 100 may also include a browser program 53 (e.g., Netscape, Internet Explorer, or other browser program) for use in accessing locations on a network 32. The browser program 53 provides for a variety of hardware platforms. Browsers are most commonly recognized for their utility for accessing information over the Internet 32. As aforementioned, a browser is a device or platform that allows a user to view a variety of service collections.

The browser retrieves information from a web server 31 or intranet server 26 using HTTP, then interprets HTML code, formats the code, and displays the interpreted result on a workstation display. The browser program 53 resides in computer memory 51 and access communication facilities modem 47 to bring resources from the network 32 to the user's browser using the modem. In order to find a resource, the user should know the network location (i.e., site) of the resource denoted by a network location identifier or URL. These identifiers are often cryptic, following very complex schemes and formats in their naming conventions.

Systems today identify, access, and process these resources desired by a user by using the processor 41, storage device 42, and memory 51 with an operating system 52 and browser program 53. The processor accepts data from memory 51 and storage device 42 over the local interface 43, for example, one or more buses. Direction from the user can be signaled by using one or more input devices, for example, mouse 44 and keyboard 45, as well as by actuating a pushbutton on the front of the scanner itself. The actions input and result output are displayed on the display terminal 46.

Also illustrated in FIG. 3A is the scan system 100 of the present invention situated in a user's computer system 21. This scan system 100 will be further explained hereafter with regard to FIGS. 4–9.

Figure 3B:
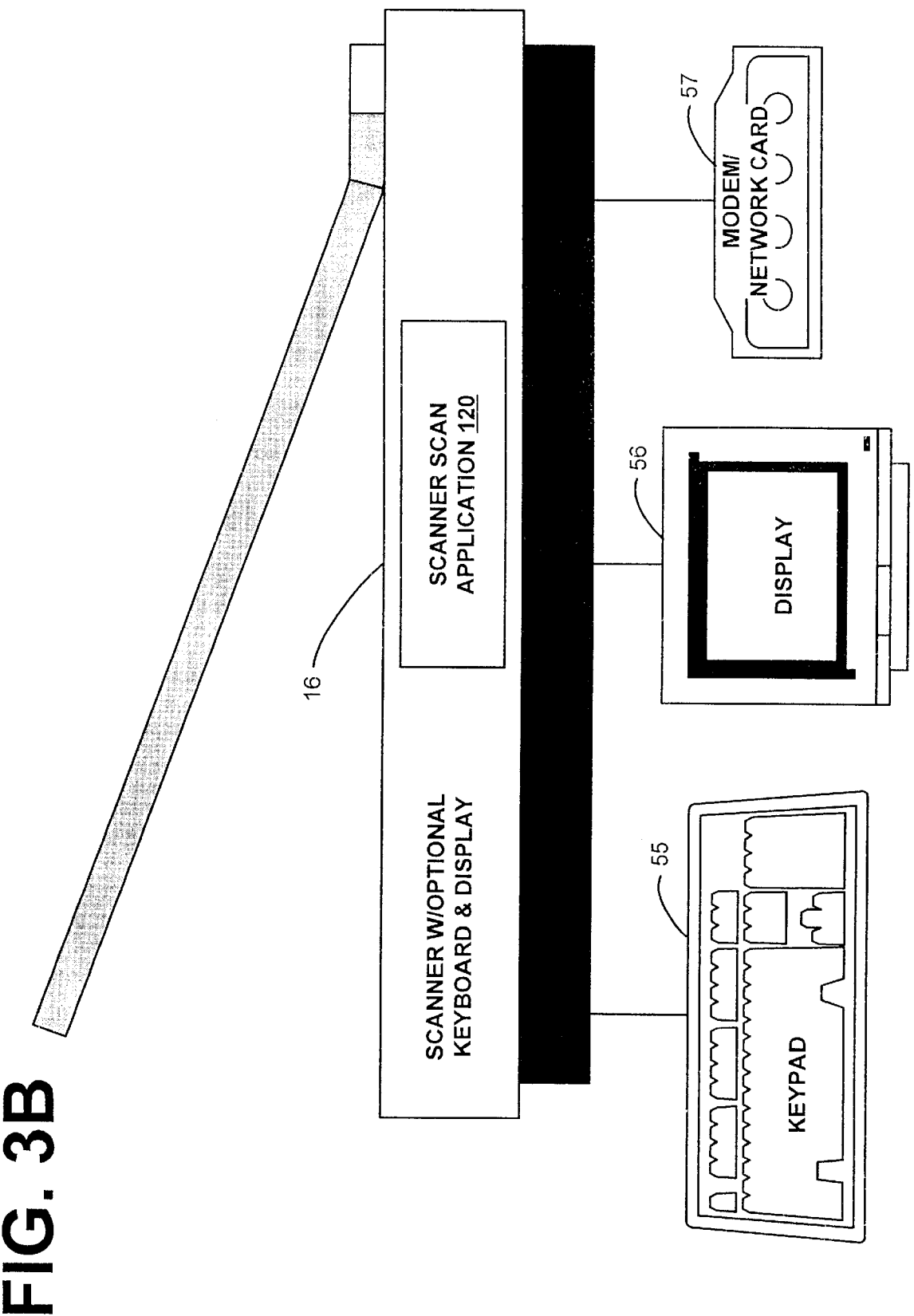
FIG. 3B is a block diagram illustrating the scan system situated within a stand-alone scanner.

Illustrated in FIG. 3B is a block diagram of a stand-alone scanner 16 including the scan application 120 of the present invention. Scanner 16 usually includes a processor (not shown), a memory (not shown) and an optical input device (not shown). The processor accepts data from the optical input device and memory over a bus (not shown). Direction from the user can be signaled by using the input devices such as a keypad 55, as well as by actuating a pushbutton (not shown) on the front of the scanner itself. The actions input and result output may be displayed on the optional display terminal 56. The stand-alone scanner 16 also includes a modem or network card 57 to establish communication with Web server 31 on network 32. Scanner 16 can also be implemented utilizing non-processor circuitry. Also illustrated in FIG. 3B, is the scan system 120 of the present invention situated in the stand-alone scanner 16. This scan system 120 resides in hardware, software or firmware of the stand-alone scanner 16. The scan system 120 will be further explained hereafter with regard to FIGS. 4B–9.

With regard to FIG. 4A, illustrated is an example of a scan system 100 on a computer system 21. The first step of scan system 100, residing on a computer, is to initialize the scan system 100 on the computer, at step 101. The scan system 100 directs the scanner 22 (FIG. 1) to scan an image at step 102. At step 103, the scan system 100 displays the image scan on the display 46 (FIG. 3A). Along with this display of the image scan is a list of applications and destinations for images to be transferred. At step 104, the scan system 100 accepts the user selection of a destination for the image to be posted.

At step 105, the scan system 100 checks if the destination selected is a scan to web site. If the destination selected at step 104 is a scan to web site, the scan system 100 executes the select site process 140 at step 106. The select site process 140 is herein defined in further detail with regard to FIG. 5.

If the destination selected at step 104 is not a scan to web site, the scan system 100 utilizes the user-configured site that represents the selected destination at step 107.

After the correct site for the selected destination has been determined at steps 106 or 107, the scan system 100 performs the catalog process 150 at step 108. The catalog process 150 allows a user to add information to the images previously scanned. The catalog process 150 is herein defined in further detail with regard to FIG. 6.

At step 110, the scan system 100 transmits the image data to the selected web site. The transmit data process 160 is herein defined in further detail with regard to FIG. 7.

At step 112, the scan system 100 queries if the user desires to review the image data transmitted at step 112. If the user desires to review the image data, the scan system 100 initiates operation of the browser program 53 at step 113. After the scan system 100 initiates operation of the browser program 53, or if the user indicates that the user does not wish to review the image data transmitted, the scan system 100 exits at step 119.

Figure 4B:
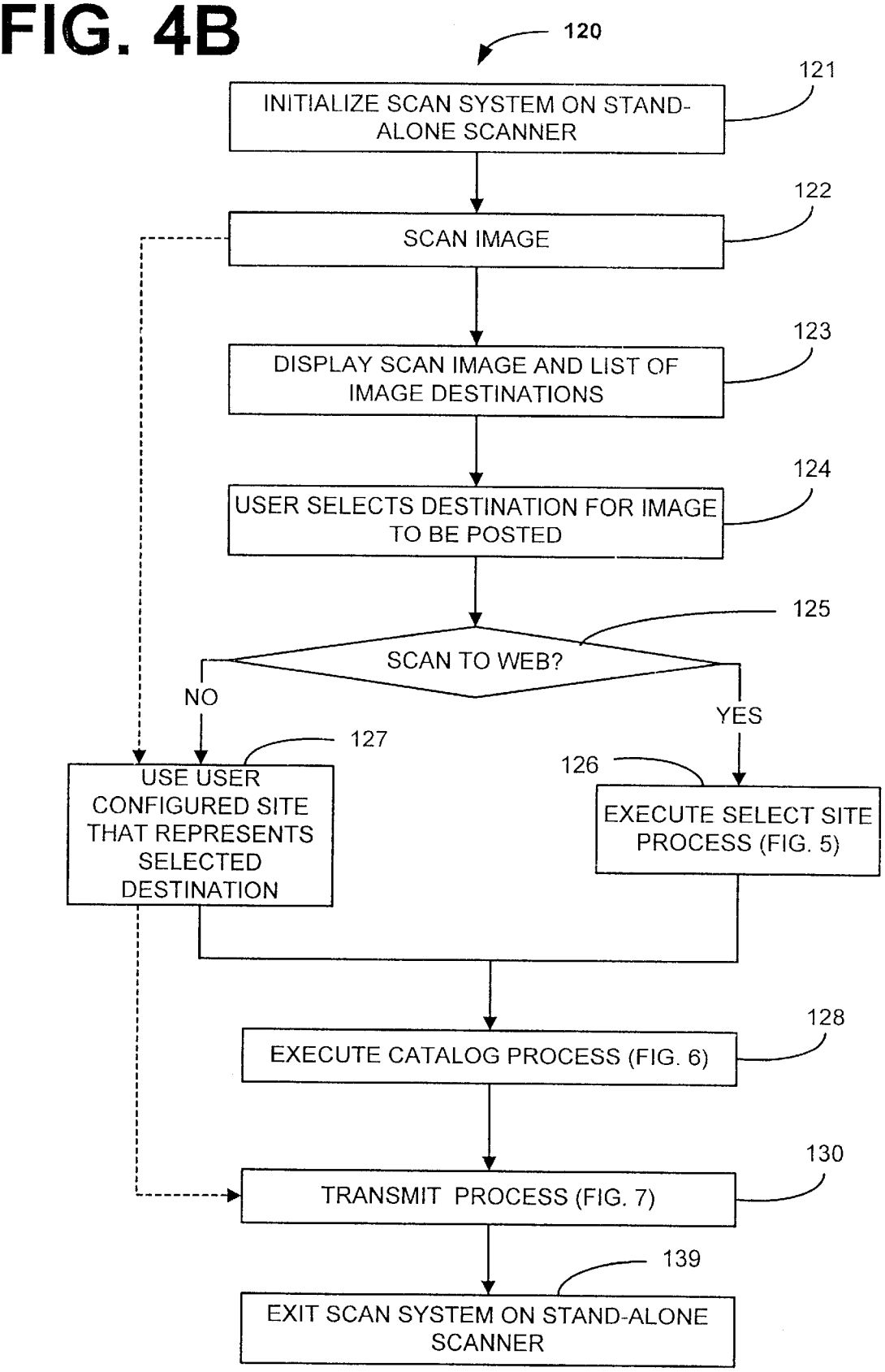
FIG. 4B is a flow chart of the scan system on a user stand-alone scanner, of the present invention, as shown in FIG. 3B.

Illustrated in FIG. 4B is an example of the scan system 120 residing in a stand-alone scanner 16 (FIG. 3B) that is connected to a web site. First, the user initiates the scan system 120 by pressing a start button (not shown) on the scanner 16 at step 121. Next, at step 122, the image is scanned into the scanner 16.

At step 123, a list of potential applications and destinations for image transfer is displayed if possible. If scanner 16 (FIG. 3B) does not provide a display 56 (FIG. 3B) for the list of potential applications and destinations to be displayed, the scan system 120 performs a minimal scanner configuration operation that is herein defined below. However, there are some scanners that provide a display 56 (FIG. 3B) to be utilized for communication with a user. In these cases, the scan system 120 may display the image scan along with the list of potential applications and destinations on the scanner display 56 (FIG. 3B) at step 123, if the stand-alone scanner 16 (FIG. 3B) has a large enough display. In applications where the stand-alone scanner 16 does not have a large enough display, only the display of the list of potential applications and destinations is performed. At step 124, the scan system 120 then accepts the user selection of a destination for the image to be posted.

At step 125, the scan system 120 checks if the destination selected is a scan to web site. If the destination selected at step 124 is a scan to web site, the scan system 120 executes the select site process 140 at step 126. The select site process 140 is herein defined in further detail with regard to FIG. 5.

If the destination selected at step 124 is not a scan to web site, the scan system 120 utilizes the user-configured site that represents the selected destination at step 127.

After the correct site for the selected destination has been determined at steps 126 or 127, the scan system 120 performs the catalog process 150 at step 128. The catalog process 150 allows a user to add information to the images previously scanned. The catalog process 150 is herein defined in further detail with regard to FIG. 6.

At step 130, the scan system 120 on the stand-alone scanner transmits the image data to the selected web site. The transmit data process 160 is herein defined in further detail with regard to FIG. 7.

If the scanner has a built in browser capability, the scan system 120 on the stand-alone scanner may allow the user to review the image data transmitted. If the user wishes to review the image data the stand-alone scan system 120 on the stand-alone scanner starts the web browser program 53. After the scan system 120 on the stand-alone scanner starts the web browser program 53, or if the user does not wish to review the image data transmitted, the scan system 120 exits at step 139.

In a minimal scanner configuration operation that lacks either a keypad or display, the scan system 120 on the stand-alone scanner performs the following steps. First, the scanner operation is initialized at step 121. The scan system 120 next scans the image at step 122. The scan system 120 then proceeds to identify the user-configured site that represents the predetermined destination at step 127. In the minimal scanner configuration, the scan system 120 proceeds to transmit the data at step 130. The transmit data process 160 is herein defined in further detail with regard to FIG. 7. After transmitting the data to the user-configured site that represents the predetermined destination, the scan system 120 exits the minimal scanner configuration operation step 139.

Figure 5:
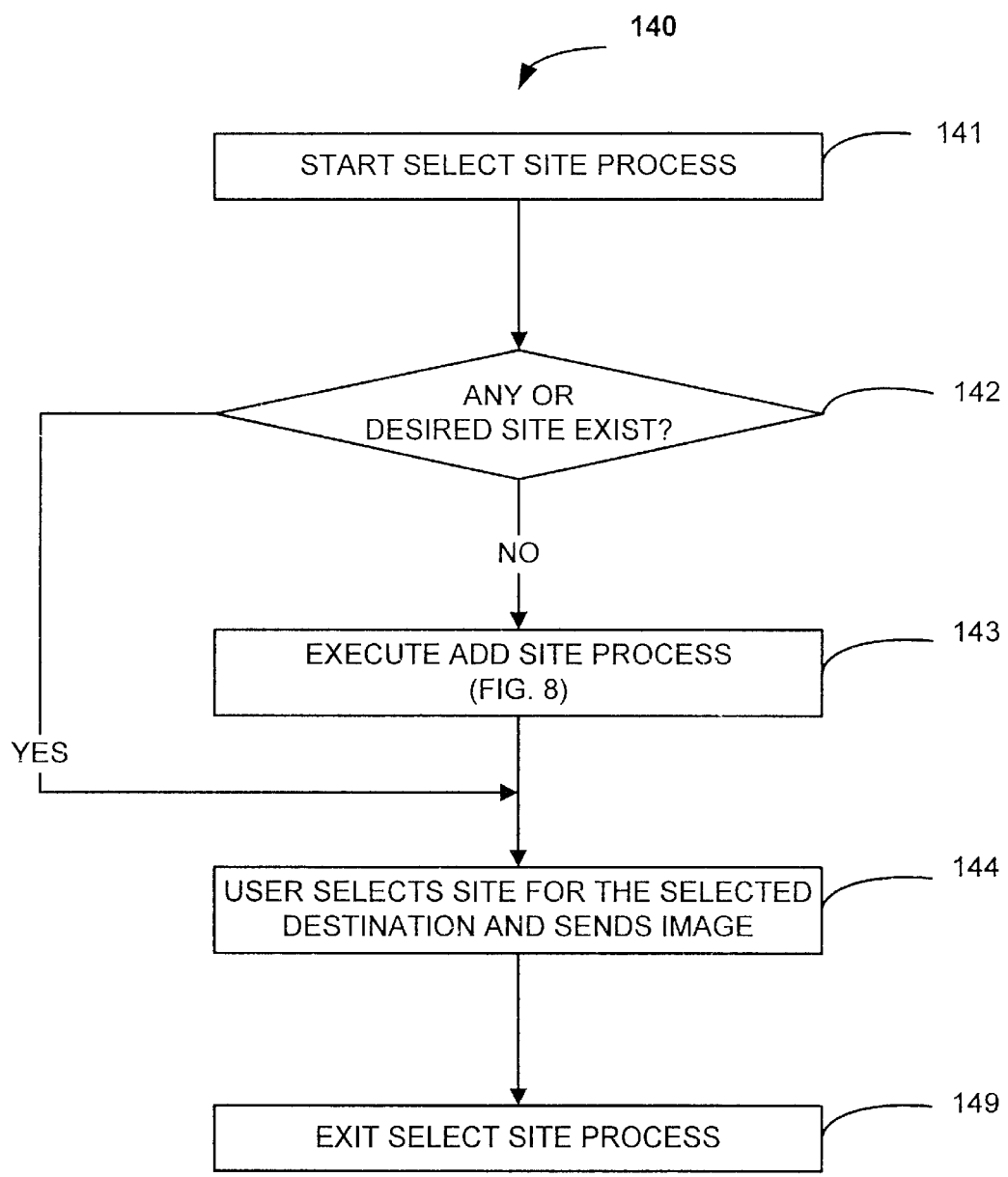
FIG. 5 is a flow chart of the select site process for the scan system of the present invention, on both the computer-controlled and stand-alone scanner, as shown in FIGS. 4A and 4B.

Illustrated in FIG. 5 is the flow diagram of the select site process 140. The select site process 140 is executable by both the scan system 100 on computer 21, and the scanner scan application 120 on scanner 16. The select site process 140 is initialized at step 141. At step 142, the select site process 140 determines if any sites exist or the desired site exists at a destination previously selected. If no sites exist or the desired site does not exist at the destination previously selected, the select site process 140 prompts the user to add a site to the destination list at step 143. The add site process 190 is herein defined in further detail with regard to FIG. 8. If the desired site does exist, the select site process 140 allows a user to select a site for the selected destination at step 144. Also, at step 144, the select site process 140 sends the image scanned to the user selected site for the selected destination. After the select site process 140 sends the image to the user-selected site for the selected destination, the select site process 140 exits at step 149.

Figure 6:
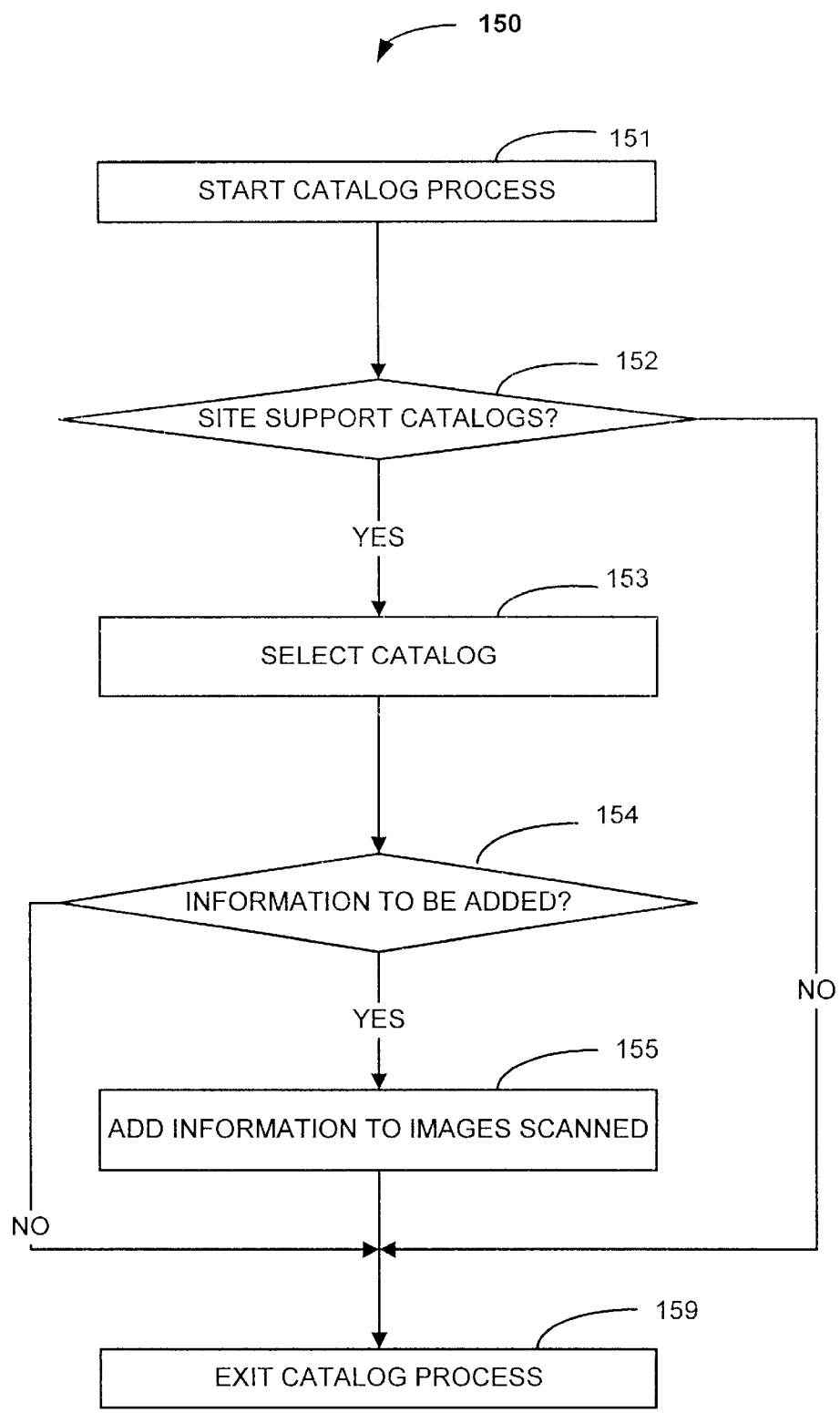
FIG. 6 is a flow chart of the add catalog information process for the scan system of the present invention, on both the computer-controlled and stand-alone scanner, as shown in FIGS. 4A and 4B.

Illustrated in FIG. 6 is the flow diagram of the catalog process 150. The catalog process 150 is executable by both the scan system 100 on computer 21 and the scanner scan application 120 on scanner 16, and allows a user to add information to the images previously scanned. The catalog process 150 to add information is initialized, at step 151. At step 152, the catalog process 150 determines if the selected site supports catalogs. If the site selected at step 144 (FIG. 5) does not support catalog information, the catalog process 150 proceeds to step 159 and exits the catalog process 150. If the site selected at step 144 (FIG. 5) does support catalog information, the catalog process 150 allows the user to select a catalog at step 153.

At step 154, the catalog process 150 queries the user if more information (i.e. captions, size of the image, description or the like) is to be added to each individual picture in the catalog. If more information is not to be added to each individual picture in the catalog, the catalog process 150 proceeds to step 159 and exits. If more information is to be added to each individual picture in the catalog, the catalog process 150 solicits the user to add the desired information to each of the images scanned. After the desired information is added to the desired images, the catalog process 150 exits at step 159.

With regard to FIG. 7, illustrated is an example of the transmit process 160. The transmit process 160 is executed by both the scan system 100 on computer 21, and the scanner scan application 120 on scanner 16. The transmit process 160 is first initialized at step 161. At step 162, the transmit process 160 determines if the destination site is a supported site.

If the destination site is not a supported site, the transmit process 160 opens a file transfer protocol (FTP) connection that allows the user to log into the selected server at step 163. The transmit process 160 generates a thumbnail image for each image to be uploaded at step 164. At step 165, the transmit process 160 requests and receives the catalog file. The transmit process 160 next inserts a link into each of the thumbnail, image and information data in the catalog at step 166. At step 167, the image data is encapsulated in HTML data and saved to the local server.

The catalog file is then saved by the transmit process 160 to the destination site at step 168. Next, the transmit process 160 transmits the encapsulated HTML thumbnail and full-size image data to the destination web server at step 171. The transmit process 160 closes the FTP connection at step 172, and sets up the URL to the base URL at step 173. The transmit process 160 then exits the transmit process at step 189.

If the destination site is a supported site, the transmit process 160 at step 181, connects to the supported server via the network 32. At step 182, the transmit process 160 transmits the image data in a form upload using an emulated submit HTTP function.

The transmit process 160 next verifies whether or not the transmitted data was received without error at step 183. The verification of transmission without error is performed by verifying the return codes. If the transmission performed at step 182 is without error, the transmit process 160 receives the destination URL after receiving the return codes at step 184. The transmit process 160 then exits the transmit process at step 189.

If the transmission at step 182 endured an error, the transmission process 160 receives an error code at step 186, and displays the error to the user at step 187. The transmit process 160 then exits at step 189.

Illustrated in FIG. 8 is an example of the add site process 190. The add site process 190 is executable by both the scan system 100 on computer 21, and the scanner scan application 120 on scanner 16. First, the add site process 190 is initialized at step 191. The add site process 190 then queries the user if the updated site list is to be retrieved at step 192.

If the updated site list is to be retrieved, the site process 190 then retrieves the updated site list at step 193 and returns to step 192. If the updated site list is not to be retrieved at step 192, the add site process 190 then queries the user if custom sites are to be added at step 194.

If custom sites are to be added, the add site process 190 queries the user at step 195, to enter the name for the custom site, the server name for the custom site to be supported by, and a remote directory and base URL to view images for the custom site. At step 196, the add site process 190 queries the user to indicate if catalog support is enabled for the custom site. The add site process 190 then proceeds to step 203 to permit the user to add a specific site name and password for the custom site.

If the custom site is not to be added, the add site process 190 permits the user to select a well-known site at step 201. At step 202, the user configures the well-known site for the user list. The add site process 190 proceeds to step 203 to permit the user to add a specific site name and password for the non-custom site.

After either a custom or non-custom site has been added, the add site process 190 queries the user if the newly added site is to be added to the user destination list at step 204. If the newly added site is to be added to a user destination list, the add site process 190 adds the newly added user site to the user destination list at step 205. After the newly added user site has been added to the user destination list or the user indicated that the site was not to be added to the user destination list, the add site process 190 exits at step 209.

Illustrated in FIG. 9, is the block diagram for the different types of image destination site lists. Illustrated in block 211, is an example of the secured site list that is a list of supported sites that are maintained and made available only to the scan system 100 (FIG. 4) or 120 (FIG. 5) of the present invention. The secured site list can be tied to a button labeled "download current sites." But not having any supported HTML around the file, the visibility of the secured site list will be hidden from the normal web cruiser (i.e. a person who is operating web browser software). It is also desirable to encrypt the secured site's list so that more sophisticated web cruisers will not be able to copy the list. The exact format and location of the "Gold Sites" list should not be publicly disclosed to prevent casual browsing. The inventors keep the technical information contained in the list confidential to prevent anyone from abusing special made-for-supported access URLs. Although the names in the list can be made available, there could be some other sensitive information in the list: web site expiration dates, private URLs for uploading, etc.

Block 212 is an example of the local available site list. This is essentially a copy of the secured site list that resides on the user's local machine. It is an encrypted file to protect the list from being copied. A user cannot access and scan an image to a location on this local available site list, unless the site has been copied into the user's configured site's list.

Block 213 is an example of the user configured site list. This user's configured site list will appear in the scan to web destination list selected by the user at step 144 (FIG. 6). Once a site has been inserted into, the user configured site list is available for the user to scan images to on the Web.

Block 214 is an example of the user's main drop-down destination list. Users main drop-down destination list is the user's current scanning solutions.

The previously defined flow charts show the architecture, functionality, and operation of a possible implementation of software for transferring images from a scanner to an online web page software.

In this regard, each block represents a module, segment, or portion of code, which comprises one or more executable instructions for implementing the specified logical function (s). It should also be noted that in some alternative implementations, the functions noted in the blocks may occur out of the order. For example, blocks shown in succession may in fact be executed substantially concurrently or the blocks may sometimes be executed in the reverse order, depending upon the functionality involved, as described herein above.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method for scanning and transferring images to a web site, the method comprising:

scanning an image using a scanner;

determining a location on a network to transfer said image using a control integrated on the scanner, the location corresponding to a world wide web (WWW) location;

connecting said scanner directly to said network; and transmitting said image to said location on said network, the transmitting initiated by the scanner.

2. The method of claim 1, wherein determining a location further comprises displaying a plurality of destinations; and selecting one of said plurality of destinations for transmitting said image.

3. The method of claim 2, further comprising:

adding a new location to one of said plurality of destinations.

4. The method of claim 1, further comprising:

determining if said location supports adding additional information to said image.

5. The method of claim 4, wherein determining if said location supports adding additional information further comprises:

providing for said additional information to be added to said image.

6. The method of claim 1, further comprising:

determining if said location is a supported location.

7. The method of claim 6, wherein determining if said location is a supported location further comprises:

performing a non-support transmission if said location is not a supported location; and performing a support transmission if said location is a supported location.

8. The method of claim 7, wherein performing said non-support transmission further comprises:

generating a thumbnail image;

inserting said location information in said thumbnail image and said image;

creating a uniform resource locator for said location; and transmitting said thumbnail image to said location on said network.

9. The method of claim 7, wherein performing said non-support transmission further comprises:

encapsulating said image.

10. A system for scanning images to a web site, comprising:

means for scanning an image;

means for determining a location on a network to transfer said image, said means including control means integrated on the scanner, the location corresponding to a world wide web (WWW) location;

means for connecting said scanning means directly to said network; and means for transmitting said image to said location on said network, the transmitting initiated by the scanner.

11. The system of claim 10, wherein the determining a location means further comprises:

means for displaying a plurality of destinations; and means for selecting one of said plurality of destinations for transmitting said image.

12. The system of claim 10, further comprising:

means for adding a new location to one of said plurality of destinations.

13. The system of claim 10, further comprising:

means for determining if said location supports adding additional information to said image.

14. The system of claim 10, wherein said determining if said location supports adding additional information means further comprises:

means for adding said additional information to said image.

15. The system of claim 10, further comprising:

means for performing a non-support transmission if said location is not a supported location; and means for performing a support transmission if said location is said supported location.

16. The system of claim 15, wherein said performing a non-support transmission means further comprises:

means for generating a thumbnail image;

means for inserting said location information in said thumbnail image and said image;

means for creating a uniform resource locator for said location; and means for transmitting said thumbnail image to said location on said network.

17. The system of claim 15, wherein said performing a non-support transmission means further comprises:

means for encapsulating said image.

18. A system for scanning and transferring images directly to a web device, said scanner system comprising:

a scanner for generating a scanned image, said scanner including a control panel;

a web device on a network, for storing scanned images; and a scanning mechanism directly coupled to the network for transferring said scanned images generated by said scanner, to said web device for storage, the transferring initiated by said scanner.

19. The system of claim 18, further comprising:

a display for exhibiting a plurality of destinations; and an input device for allowing a user to select one of said plurality of destinations.

20. The system of claim 18, further comprising:

a scanning mechanism for adding a new web device to one of said plurality of destinations.

21. The system of claim 18, further comprising:

a scanning mechanism for determining if said web device supports adding additional information to said scanned image.

22. The system of claim 18, wherein said scanning mechanism further comprises:

a scanning mechanism for adding additional information to said scanned image.

23. The system of claim 18, further comprising:

a scanning mechanism for providing non-supported transmission if said web device is not a supported location, said scanning mechanism further comprising:

a non-support transmission mechanism for generating a thumbnail image;

a non-support transmission mechanism for creating a uniform resource locator pointing to said web device;

a non-support transmission mechanism for inserting said uniform resource locator in said thumbnail image; and a non-support transmission mechanism for transmitting said thumbnail image to said web device on said network.

24. The system of claim 18, further comprising:

a scanning mechanism for providing non-supported transmission if said web device is a non-supported location, said scanning mechanism further comprising:

a non-supported transmission mechanism for encapsulating said scanned image.

* * * * *